(12) United States Patent
Ren et al.

(10) Patent No.: US 12,098,263 B1
(45) Date of Patent: Sep. 24, 2024

(54) COMPOSITE INSULATING MATERIAL BASED ON DIELECTROPHORETIC FORCE ORIENTATION AND ITS PREPARATION METHOD

(71) Applicant: SICHUAN UNIVERSITY, Sichuan (CN)

(72) Inventors: Junwen Ren, Chengdu (CN); Zi Wang, Chengdu (CN); Shenli Jia, Chengdu (CN); Lihua Zhao, Chengdu (CN); Huachao Wei, Chengdu (CN); Chao Bian, Chengdu (CN); Guoqing Jiang, Chengdu (CN); Ruichi Zeng, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 18/393,580

(22) Filed: Dec. 21, 2023

(30) Foreign Application Priority Data

Aug. 7, 2023 (CN) .......................... 202310983976.4

(51) Int. Cl.
 C09C 1/40 (2006.01)
 C08K 9/10 (2006.01)
 C09C 3/00 (2006.01)
(52) U.S. Cl.
 CPC .............. C08K 9/10 (2013.01); C09C 1/407 (2013.01); C09C 3/006 (2013.01); *C08K 2201/005* (2013.01)
(58) Field of Classification Search
 CPC ........................ C09C 1/407; C08K 2201/005
 See application file for complete search history.

(56) References Cited

U.S. PATENT DOCUMENTS

2009/0277839 A1 11/2009 Linford

FOREIGN PATENT DOCUMENTS

| CN | 112300536 A | 2/2021 |
|----|-------------|--------|
| CN | 115093608 A | 9/2022 |

(Continued)

OTHER PUBLICATIONS

First Office Action in Chinese Application No. 202310983976.4 mailed on Sep. 13, 2023, 14 pages.

(Continued)

*Primary Examiner* — Monica A Huson
(74) *Attorney, Agent, or Firm* — PORUS IP LLC

(57) ABSTRACT

A composite insulating material based on dielectrophoretic force orientation and its preparation method are provided. The method includes: S1, preparing dielectric composite microspheres with a dielectric epoxy resin as a core and a hexagonal boron nitride sheet as a shell; S2, dispersing the hexagonal boron nitride sheet and the dielectric composite microspheres in an organic solvent to obtain a dispersion liquid, and adding an epoxy resin, an epoxy resin curing agent, and an epoxy resin accelerator to the dispersing liquid, and evaporating the organic solvent to obtain a composite substrate; S3, pouring the composite substrate into a container, wherein an upper surface and a lower surface of the container are connected with electrodes, respectively, transferring the container to a vacuum oven, and connecting a power supply of the container to adjust a voltage amplitude and a frequency of the electrodes, conducting dielectrophoretic force orientation on the dielectric composite microspheres in the composite substrate, so as to cause the dielectric composite microspheres to arrange along a direction of electric field; S4, increasing a temperature of the container to cure the composite substrate, cutting off the (Continued)

power supply to the container after curing, and obtaining the composite insulating material.

8 Claims, 8 Drawing Sheets

(56) References Cited

FOREIGN PATENT DOCUMENTS

| | | |
|---|---|---|
| CN | 115785864 A | 3/2023 |
| CN | 116102998 A | 5/2023 |
| CN | 116218143 A | 6/2023 |
| CN | 116285219 A | 6/2023 |
| JP | 2017037833 A | 2/2017 |
| WO | 2017012119 A1 | 1/2017 |

OTHER PUBLICATIONS

Notification to Grant Patent Right for Invention in Chinese Application No. 202310983976.4 mailed on Sep. 21, 2023, 5 pages.

Zhou, Hongxia et al., Preparation and Properties of Boron Nitride/Aluminium Oxide/Epoxy Resin (BN/Al2O3/EP) Heat Conductive Composites, Adhesion, Research reports and monographs, 52-55, 2012.

Xia, Yanwei et al., Preparation and Properties of Epoxy Resin/Functionalized Boron Nitride Nanosheets Composite Dielectric, Insulating Materials, 55(7): 27-33, 2022.

Hu, Sheng et al., A Novel Approach to Simulate Particle-Particle Interaction and Dielectrophoretic Dynamics, Journal of Northeastern University ( Natural Science), 42(8): 1086-1091, 2021.

Wooree Jang et al., Eco-Friendly and Scalable Strategy to Design Electrically Insulating Boron Nitride/Polymer Composites with High Through-Plane Thermal Conductivity, Composites Part B, 1-13, 2022.

COMPOSITE INSULATING MATERIAL BASED ON DIELECTROPHORETIC FORCE ORIENTATION AND ITS PREPARATION METHOD

CROSS-REFERENCE TO RELATED APPLICATIONS

This application claims priority to Chinese Patent Application No. 202310983976.4, filed on Aug. 7, 2023, the contents of which are hereby incorporated by reference to its entirety.

TECHNICAL FIELD

The present disclosure relates to the technical field of insulating materials, and in particular, to a composite insulating material based on dielectrophoretic force orientation and its preparation method.

BACKGROUND

As miniaturization, integration, and functionalization of power electronic devices advance, the heat generated during operation has a significant impact on their reliability, safety, and durability. Heat generation has become a limiting factor for further enhancing the performance and power of the power electronic devices. Therefore, it is urgent to develop insulating materials with excellent thermal conductivity. Polymer materials, such as an epoxy resin, are widely used in the field of power equipment insulation due to their insulation properties, lightweight, and excellent moldability. However, the polymer materials fail to meet application requirements of high-performance and high-power density in future power equipment due to their relatively low thermal conductivity. A hexagonal boron nitride sheet has been widely employed in the production of thermally conductive composites because of their outstanding thermal conductivity and insulation properties. However, an in-plane thermal conductivity of the boron nitride sheet is much higher than a through-plane thermal conductivity due to its anisotropy, and a significant filler ratio is required to achieve a significant enhancement in the thermal conductivity of the composite materials, which is devastating to the mechanical properties of the composite materials. Secondly, modern power electronic devices have an increasing demand for the in-plane and through-plane thermal conductivity of insulating materials, and it is difficult to control the synergistic enhancement of the in-plane and through-plane thermal conductivity by the traditional filler blending and stirring method. In addition, the thermal conductivity of the composite materials is also limited by deposition of 0-dimensional (spherical) fillers at the bottom of the matrix due to gravity during the curing process. Therefore, it is essential for the development of the power device industry to develop a composite material with excellent mechanical properties while synergistic enhancement of the in-plane and through-plane thermal conductivity.

SUMMARY

Embodiments of the present disclosure provide a method for preparing a composite insulating material based on dielectrophoretic force orientation. The method includes: S1, preparing dielectric composite microspheres with a dielectric epoxy resin as a core and a hexagonal boron nitride sheet as a shell; S2, dispersing the hexagonal boron nitride sheet and the dielectric composite microspheres in an organic solvent to obtain a dispersion liquid, and adding an epoxy resin, an epoxy resin curing agent, and an epoxy resin accelerator to the dispersion liquid, and evaporating the organic solvent to obtain a composite substrate; S3, pouring the composite substrate into a container, wherein an upper surface and a lower surface of the container are connected with electrodes, respectively, transferring the container to a vacuum oven, and connecting a power supply of the container to adjust a voltage amplitude and a frequency of the electrodes, conducting dielectrophoretic force orientation on the dielectric composite microspheres in the composite substrate, so as to cause the dielectric composite microspheres to arrange along a direction of electric field; and S4, increasing a temperature of the container to cure the composite substrate, cutting off the power supply to the container after curing, and obtaining the composite insulating material, wherein gaps between the dielectric composite microspheres in the composite insulating material are filled with the hexagonal boron nitride sheet.

In some embodiments, preparing the dielectric composite microspheres with the dielectric epoxy resin as the core and the hexagonal boron nitride sheet as the shell, includes: S11, dispersing $Al_2O_3$ nano microspheres in the epoxy resin to obtain a mixture containing dielectric epoxy resin microspheres; then adding the mixture to deionized water, heating and stirring, to obtain an aqueous dispersion containing the dielectric epoxy resin microspheres; S12, adding a surfactant to the aqueous dispersion containing the dielectric epoxy resin microspheres, and stirring at 90° C.-110° C. to obtain an emulsion containing the dielectric epoxy resin microspheres; S13, mixing the epoxy resin curing agent and the hexagonal boron nitride sheet with the emulsion containing the dielectric epoxy resin microspheres obtained in the step S12, stirring at 120° C.-140° C. to obtain the dielectric epoxy resin microspheres with the hexagonal boron nitride sheet self-assembled on the surface; and S14, performing centrifugal washing on the dielectric epoxy resin microspheres with the hexagonal boron nitride sheet self-assembled on the surface obtained in the step S13, followed by vacuum freeze-drying, to obtain the dielectric composite microspheres with the dielectric epoxy resin as the core and the hexagonal boron nitride sheet as the shell.

In some embodiments, a particle size of the hexagonal boron nitride sheet in the step S13 is 2 μm.

In some embodiments, a particle size of the hexagonal boron nitride sheet in the step S2 is within a range of 5 μm to 10 μm.

In some embodiments, a particle size of the $Al_2O_3$ nano microspheres is within a range of 20 to 40 nm.

In some embodiments, a mass ratio of the hexagonal boron nitride sheet to the dielectric composite microspheres in the step S2 is 1:1.

In some embodiments, in the step S3, the voltage amplitude of the electrodes is 2 kV and the frequency of the electrodes is 10 Hz.

In some embodiments, the S4 is carried out at atmospheric pressure, and the curing the composite substrate includes: increasing the temperature of the container to 120° C., and curing at 120° C. for 2 h, and increasing the temperature of the container to 130° C. and curing at 130° C. for 2 h.

In some embodiments, the surfactant in the step S12 is cetyltrimethylammonium chloride.

In some embodiments, the organic solvent in the step S2 is acetone.

The composite insulating material is prepared with dielectric composite microspheres as main components of the thermal conductivity channel and h-BN as a bridge connecting the main components, while the dielectric composite microspheres are induced to be distributed in a chain-like arrangement along the direction of the electric field by the dielectrophoretic effect, so as to minimize the thermal resistance along the direction of the thermal field. Due to the h-BN as a connecting component between adjacent chains, the heat flow can also be efficiently transferred in a vertical direction of the thermal field, resulting in a synergistic enhancement of the thermal conductivity of the composite insulating material in the in-plane and through-plane directions. The whole dielectrophoresis process is carried out in a room temperature vacuum environment. After the vacuum degassing is completed, the temperature is raised and the curing of the composite material is completed under atmospheric pressure.

BRIEF DESCRIPTION OF THE DRAWINGS

The present disclosure is further illustrating by way of exemplary embodiments, which is describing in detail with reference to the accompanying figures. These embodiments are not limiting, and in these embodiments, the same numbering denotes the same structure, wherein.

DETAILED DESCRIPTION

Figure 1:
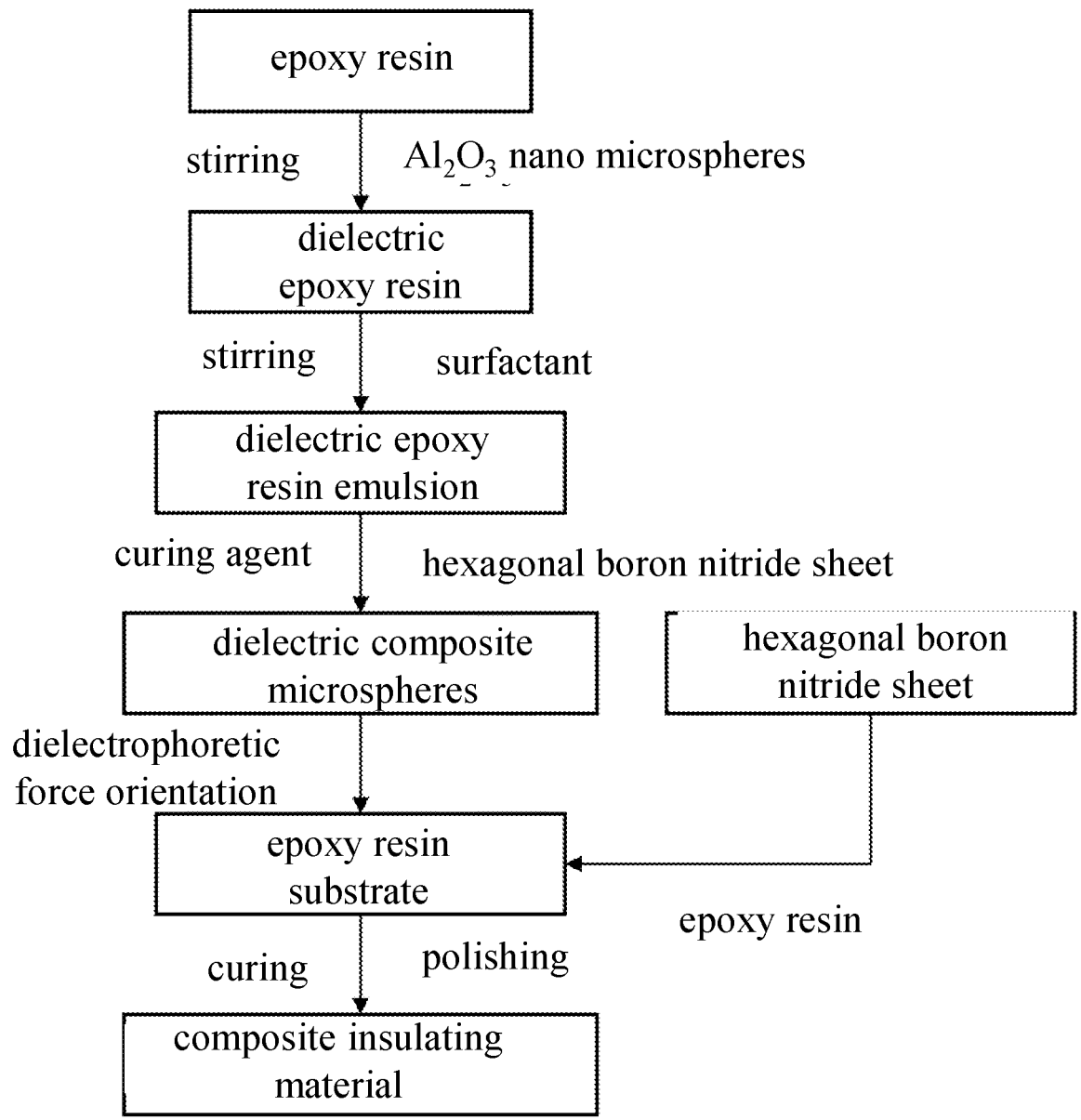
FIG. 1 is an exemplary flowchart of a method for preparing a composite insulating material based on dielectrophoretic force orientation according to some embodiments of the present disclosure.

In order to more clearly illustrate the technical solution of the embodiments of the present disclosure, the accompanying drawings required for the description of the embodiments are briefly described below. Obviously, the accompanying drawings in the following description are only some examples or embodiments of the present disclosure, and a person of ordinary skill in the art can also apply the present disclosure to other similar scenarios without creative labor based on these drawings. Unless obviously obtained from the context or the context illustrates otherwise, the same numeral in the drawings refers to the same structure or operation.

It should be understood that the terms "system," "device," "unit," and/or "module" are used herein as a way to distinguish between different components, elements, parts, sections, or assemblies at different levels. However, the words may be replaced by other expressions if the same purpose may be achieved by other words.

As disclosed in the present disclosure and the claims, unless otherwise indicated by the context, the words "one," "a," "a kind of," and/or "the" are not specific and may include the plural form. In general, the terms "including" and "comprising" indicate the inclusion of explicitly identified steps and elements, but do not imply an exclusive list. The method or apparatus may also include other steps or elements.

Flowcharts are used in the present disclosure to illustrate the operations performed by a system according to the embodiments disclosed herein. It should be understood that the preceding or following operations are not necessarily performed in a specific order. Instead, the steps may be processed in reverse order or simultaneously. It is also possible to add other operations to these processes or remove a step or steps from these processes.

Dielectrophoresis (DEP) is a technique that involves the movement of particles in an electric field due to dielectrophoretic forces. The process involves suspending dielectric particles in a liquid and manipulating their movement by applying an electric field. Dielectrophoresis may be used to arrange particles in a material to prepare materials with specific properties.

The dielectrophoretic force is primarily induced by the polarization effect of the electric field on the particles. When charged particles are suspended in a conductive liquid, the applying of an electric field polarizes the particles so as to move in the electric field.

Embodiments of the present disclosure provide a method for preparing a composite insulating material based on dielectrophoretic force orientation, as shown in FIG. 1. The preparation method may include following operations:

S1, preparing dielectric composite microspheres with a dielectric epoxy resin as a core and a hexagonal boron nitride sheet as a shell.

An epoxy resin is a polymer oligomer containing two or more epoxy groups, with an organic compound such as an aliphatic, alicyclic, or aromatic compound as a backbone, and capable of forming a useful heat-cured product by reaction of the epoxy groups. The epoxy resins used herein are thermoplastic resins with thermosetting property, which is capable of reacting with curing agents, catalysts, or additives to form cured products. For example, the epoxy resin may include bisphenol A-type epoxy resin, bisphenol F-type epoxy resin, polyphenol glycidyl ether epoxy resin, aliphatic glycidyl ether epoxy resin, glycidyl ester-type epoxy resin, or the like. The epoxy resin itself has dielectric property. The dielectric property refers to the ability of a material to respond to an electric field, i.e., the polarization characteristics of the material in the electric field.

The epoxy resin is widely used as insulating materials in the electrical and electronic fields, which is an ideal material for encapsulating, insulating, and protecting electrical components due to their excellent insulating properties. For example, the epoxy resin plays a key role in electronic encapsulation, circuit board manufacturing, cable insulation, and electrical equipment such as motors and transformers, providing reliable insulation and mechanical protection.

The dielectric epoxy resin is the epoxy resin whose dielectric property has been adjusted or improved. The epoxy resin, as a material with good insulating properties, contains epoxy groups in its molecular structure, which enables it to be polarized in an electric field. In order to further improve or modulate the dielectric properties of the epoxy resin, it may be adjusted by adding fillers, changing the chemical formulation of the resin, or the like, to obtain the dielectric epoxy resin that can effectively block the flow of electric current and is more suitable for use as an insulating material for electrical and electronic devices. In some embodiments, the dielectric constant of the epoxy resin can be increased by adding nanoscale fillers, such as alumina nanoparticles, silica nanoparticles, or boron nitride nanosheets so as to improve the insulating properties.

In some embodiments, a conductive filler, such as carbon nanotubes or conductive carbon black, may be added to the epoxy resin, which can increase the conductivity of the epoxy resin while maintaining its insulating property.

In some embodiments, modifiers, such as silicone oils, polyether silicone, or the like, may be added to the epoxy resin to improve its flexibility, heat resistance, and dielectric property.

In some embodiments, fiber reinforcing materials, such as glass fibers or carbon fibers, may be added in the epoxy resin to enhance the mechanical strength and electrical conductivity of the epoxy resin.

In some embodiments, the arrangement and structure of the dielectric epoxy resin and other fillers in the composite insulating material may be designed to regulate the arrangement of the molecular chains to improve the performance of the composite insulating material.

In some embodiments, the dielectric epoxy resin may be further compounded with high-performance thermal conductive materials to obtain insulating materials with good heat dissipation property, which reduces the impact of heat on the mechanical properties of the composite materials. The high-performance thermal conductive materials may include, but are not limited to, graphene, carbon nanotubes, hexagonal boron nitride, and/or aluminum nitride.

S2, dispersing the hexagonal boron nitride sheet and the dielectric composite microspheres in an organic solvent to obtain a dispersion liquid, and adding an epoxy resin, an epoxy resin curing agent, and an epoxy resin accelerator to the dispersion liquid, and evaporating the organic solvent to obtain a composite substrate.

A curing agent and an accelerator are required to be added during the curing process of the epoxy resin to promote the reaction.

The curing agent of the epoxy resin usually chemically reacts with the epoxy groups of the epoxy resin to form a three-dimensional cross-linking network structure, transforming the epoxy resin from a liquid or flowable state to a solid and hardened state.

The curing agent of the epoxy resin may include amines, anhydrides, polyphenols, or the like.

The accelerator of the epoxy resin is used to accelerate the reaction rate between the epoxy resin and the curing agent, thereby reducing the hardening time.

The epoxy resin accelerator may include amines and acids.

In some embodiments, the organic solvent in the step S2 may be acetone.

In some embodiments, a particle size of the hexagonal boron nitride sheet used in the S2 may be within a range of 5 μm to 10 μm.

In some embodiments, a mass ratio of the hexagonal boron nitride sheet and the dielectric composite microspheres in the step S2 may be 1:1.

S3, pouring the composite substrate into a container, wherein an upper surface and a lower surface of the container are connected with electrodes, respectively, transferring the container to a vacuum oven, and connecting a power supply of the container to adjust a voltage amplitude and a frequency of the electrodes, conducting dielectrophoretic force orientation on the dielectric composite microspheres in the composite substrate, so as to cause the dielectric composite microspheres to arrange along a direction of electric field.

As used herein, "arrangement along the direction of the electric field" means that in any one electric field, an arrangement direction of the dielectric composite microspheres is parallel to the direction of the electric field under the action of the dielectrophoretic force.

Figure 2A:
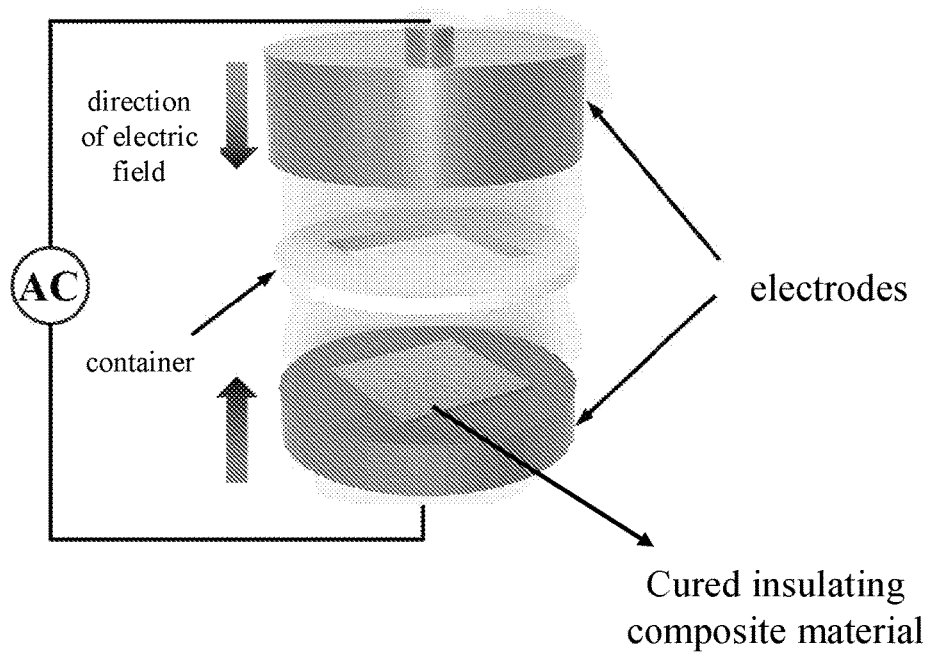
FIG. 2A is a schematic diagram of a container and electrode devices with the dielectrophoretic force orientation according to some embodiments of the present disclosure.

FIG. 2A is a schematic diagram of a container and electrode devices with the dielectrophoretic force orientation according to some embodiments of the present disclosure.

Figure 2B:
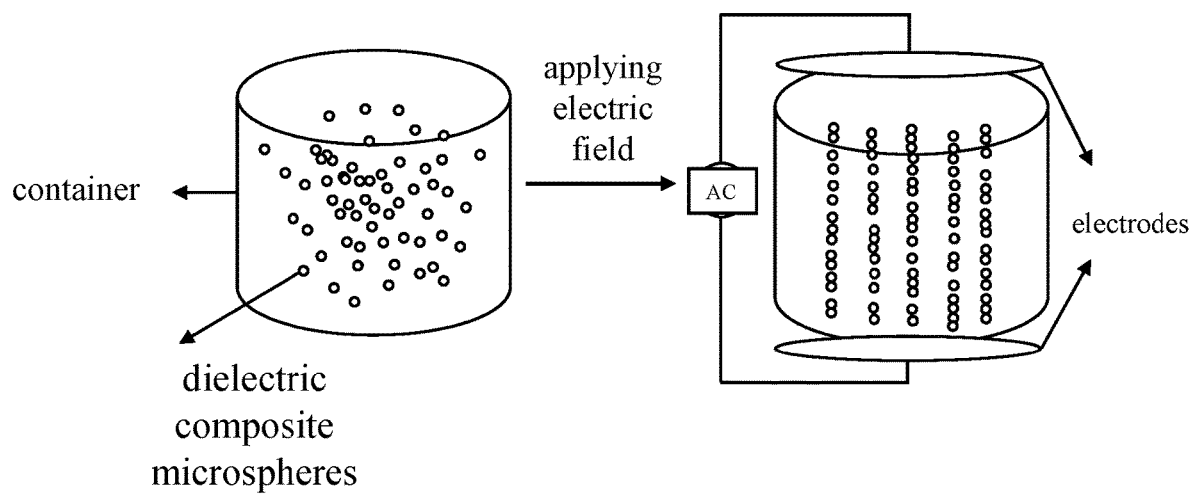
FIG. 2B is a microscopic schematic diagram of the dielectrophoretic force orientation of the dielectric composite microspheres in the composite insulating material under an action of an electric field according to some embodiments of the present disclosure.

FIG. 2B is a microscopic schematic diagram of the dielectrophoretic force orientation of the dielectric composite microspheres in the composite insulating material under an action of an electric field according to some embodiments of the present disclosure.

As shown in FIG. 2B, the dielectric composite microspheres are randomly arranged in the composite insulating material before applying the electric field. Under the action of the electric field, the dielectric composite microspheres are arranged in a chain-like arrangement along the direction of the electric field.

In some embodiments, the voltage amplitude and a frequency of the electrodes may be adjusted by using an external power supply to apply varying dielectrophoretic forces to the composite substrate in the container, thereby orienting the dielectric composite microspheres in the composite substrate in different directions according to the electrophoretic force.

In some embodiments, in the S3, the voltage amplitude of the electrodes may be 2 kV and the frequency of the electrodes may be 10 Hz.

S4, increasing a temperature of the container to cure the composite substrate, cutting off the power supply to the container after curing, and obtaining the composite insulating material, wherein gaps between the dielectric composite microspheres in the composite insulating material are filled with the hexagonal boron nitride sheet.

In some embodiments, the step S1 may include following operations.

S11, dispersing $Al_2O_3$ nano microspheres in the epoxy resin to obtain a mixture containing dielectric epoxy resin microspheres; then adding the mixture to deionized water, heating and stirring, to obtain an aqueous dispersion containing the dielectric epoxy resin microspheres.

In some embodiments, a particle size of the $Al_2O_3$ nano microspheres may be within a range of 20 nm to 40 nm.

S12, adding a surfactant to the aqueous dispersion containing the dielectric epoxy resin microspheres, and stirring at 90° C.-110° C. to obtain an emulsion containing the dielectric epoxy resin microspheres.

In some embodiments, the stirring temperature in the S12 may be 90° C., 95° C., 100° C., or 110° C. In some embodiments, the stirring temperature in the S12 may be 100° C.

In some embodiments, the surfactant may be cetyltrimethylammonium chloride.

S13, mixing the epoxy resin curing agent and the hexagonal boron nitride sheet with the emulsion containing the dielectric epoxy resin microspheres obtained in the step S12, stirring at 120° C.-140° C., to obtain the dielectric epoxy resin microspheres with the hexagonal boron nitride sheet self-assembled on the surface.

In some embodiments, the stirring temperature in the S13 may be 120° C., 130° C., 135° C., or 140° C. In some embodiments, the stirring temperature in the S13 may be 130° C.

In some embodiments, a particle size of the hexagonal boron nitride sheet in the S13 may be 2 m.

S14, performing centrifugal washing on the dielectric epoxy resin microspheres with the hexagonal boron nitride sheet self-assembled on the surface obtained in the S13, followed by vacuum freeze-drying, to obtain the dielectric composite microspheres with the dielectric epoxy resin as the core and the hexagonal boron nitride sheet as the shell.

In some embodiments, a temperature of vacuum freeze-drying may be within a range of −35° C. to −45° C. In some embodiments, the temperature of vacuum freeze-drying may be −40° C.

In the S4, the curing temperature determines the reactivity of the epoxy resin with the curing agent. In the low-temperature stage, the resin is partially cured and reacts slowly, which helps to form a uniformly cured network structure, with a low internal stress and a good resin property; in the high-temperature stage, the curing reaction is complete, improving the mechanical properties and heat resistance of the composite substrate.

In some embodiments, the S4 may be carried out at atmospheric pressure, and the curing the composite substrate may include: increasing the temperature of the container to 120° C. and curing at 120° C. for 2 h, and increasing the temperature of the container to 130° C. and curing at 130° C. for 2 h.

One of the embodiments of the present disclosure provides the composite insulating material based on the dielectrophoretic force orientation, the composite insulating material being made by the preparation method described above.

Embodiment of the present disclosure has at least the following technical effects.

(1) Embodiment of the present disclosure embodiment adopts an emulsion polymerization method to prepare the dielectric composite microspheres with the dielectric epoxy resin as the core and the hexagonal boron nitride sheet as the shell, overcoming the disadvantage that the planar thermal conductivity is much higher than the through-plane thermal conductivity caused by the anisotropy of h-BN sheets.

(2) The hybrid design of embodiments of the present disclosure, using the dielectric composite microspheres as the main components of the thermal conductivity channel and h-BN sheets as the bridge, provides a connection between parallel chains of dielectric composite microspheres arranged along the direction of the electric field to achieve synergistic regulation of the in-plane and through-plane thermal conductivities of the composite material. First, in the embodiments of the present disclosure, h-BN sheets are filled between chains of the dielectric composite microspheres, facilitating the transfer of heat in the composite insulating material with the help of the excellent thermal conductivity of h-BN. Second, the phonon modulus between the dielectric composite microspheres and h-BN is matched, facilitating phonon scattering between the dielectric composite microspheres and effective heat transfer. Moreover, the embodiments of the present disclosure introduces the dielectric composite microspheres into the composite insulating material, significantly reducing the interfacial density inside the composite insulating material, thus reducing the interfacial thermal resistance of the composite insulating material. In addition, the dielectric composite microspheres do not increase the viscosity of the composite insulating material, allowing the composite insulating material to improve moldability under the same filler the epoxy resin loading, enabling it to meet the processing needs of different working conditions, and having broad application prospects.

(3) Embodiments of the present disclosure introduce dielectric $Al_2O_3$ nano microspheres into the interior of the dielectric composite microspheres, enabling the dielectric composite microspheres to overcome the force of gravity under the action of an AC electric field, thereby enhancing their dispersion within the composite insulating material, which solves the problem of uneven dispersion of 0-dimensional fillers in the composite insulating material.

(4) Due to the difference in dielectric constants between the $Al_2O_3$ nano micropheres and the epoxy resin in the dielectric composite microspheres, the embodiments of the present disclosure polarize the dielectric composite microspheres by placing them in a container with electrodes attached to the surface. This imparts dipole characteristics to the dielectric composite microspheres and induces dipole-dipole interactions between the fillers (e.g., $Al_2O_3$ nano micropheres and epoxy resin) within the dielectric composite microspheres. As a result, the 0-dimensional dielectric composite microspheres form chains along the direction of the electric field, thereby minimizing the thermal resistance of the thermally conductive composite material along the direction of the thermal field. This overcomes the limitation of traditional magnetron orientation technology that cannot control the arrangement of fillers.

EMBODIMENTS

The following embodiments provide more specific illustrations of embodiments related to the above embodiments. Some of the contents in these embodiments can also be replaced or combined with corresponding content in other embodiments to form new embodiments. Unless otherwise specified, the experimental methods in the following embodiments are conventional methods. Unless otherwise specified, the test materials used in the following embodiments are purchased from a conventional biochemical reagent company. Quantitative tests in the following embodiments were performed with three repetitions, and the results were averaged. It should be understood that the following embodiments are intended to better explain the present invention and are not intended to limit the invention.

Embodiment 1 (E 1)

As shown in FIG. 1, a method for preparing a composite insulating material based on dielectrophoretic force orientation including following operations.

Step 1: preparing the dielectric composite microspheres as follows:

(1) 1 g of dielectric $Al_2O_3$ nano microspheres was added to 10 g of liquid epoxy resin, sonicated at a power of 200 W and a frequency of 40 kHz for 15 min, and then mechanically stirred at a rotational speed of 400-450 rpm for 30 min to obtain a mixture containing the dielectric epoxy resin microspheres.

(2) 10 g of the mixture containing the dielectric epoxy resin microspheres obtained in step (1) was taken and added to 200 mL of deionized water, and mechanically stirred at 80° C. for 1 h at a rotational speed of 800 rpm to obtain an aqueous dispersion containing dielectric epoxy resin microspheres.

(3) 10 mg of cetyltrimethylammonium chloride was added to the aqueous dispersion obtained in step (2), and mechanically stirred at 300 rpm for 12 h at 100° C. to obtain an internally homogeneously dispersed emulsion containing dielectric epoxy resin microspheres.

(4) 8 g of the epoxy resin curing agent and 2 g of h-BN sheet with a particle size of 2 m were taken and mixed with the internally homogeneously dispersed emulsion containing dielectric epoxy resin microspheres obtained in step (3), and mechanically stirred at 300 rpm for 6 h at 130° C. to obtain the dielectric epoxy resin microspheres with self-assembled h-BN sheet on the surface.

(5) The dielectric epoxy resin microspheres with self-assembled h-BN sheets on the surface obtained in the step (4) were centrifuged and washed for 3 times using ethanol and deionized water at 10,000 rpm for 3 times to remove impurities such as the cetyltrimethylammonium chloride from the microsphere surface; then transferred to a freeze dryer and freeze-dried at −40° C. under vacuum condition for 48 h to obtain the dielectric composite microspheres with the epoxy resin as the core and h-BN sheet as the shell.

Step 2: 1 g of h-BN sheet with a particle size of 5-10 m and 1 g of the dielectric composite microspheres were taken and dispersed in 15 mL of acetone, sealed and stirred at a speed of 200 rpm for 30 min to obtain a homogeneously dispersed mixture A. 10 g of the epoxy resin, 8 g of the curing agent of the epoxy resin, and 0.16 g of the accelerator of the epoxy resin were taken and mixed with the homogeneously dispersed mixture A, stirred mechanically at 200 rpm at room temperature until the acetone is completely removed to obtain a composite substrate with uniformly mixed components.

Step 3: the obtained composite substrate was poured into a container with electrodes on the upper and lower surfaces, the container was transferred to a vacuum oven, the air pressure of the vacuum oven was reduced to below 104 Pa at room temperature, and the external circuitry was simultaneously adjusted. The alternating current with an amplitude of 2 kV and a frequency of 10 Hz was applied to the upper and lower surfaces of the container, completing the dielectrophoretic orientation of the dielectric composite microspheres in the composite substrate. After 4 h, the air pressure of the vacuum oven was restored to atmospheric pressure.

Step 4: the vacuum oven was heated to 120° C. to perform a curing reaction for 2 h, then the temperature was raised to 130° C. for curing for 2 h. The external power supply was cut off. After cooling, a sandpaper was used to polish the composite insulating material to obtain the composite insulating material containing dielectric composite microspheres with a filler mass fraction of 10 wt %. The dielectric composite microspheres in the composite insulating material are arranged in the direction of the electric field, and the h-BN sheets are filled between microspheres.

Figure 3:
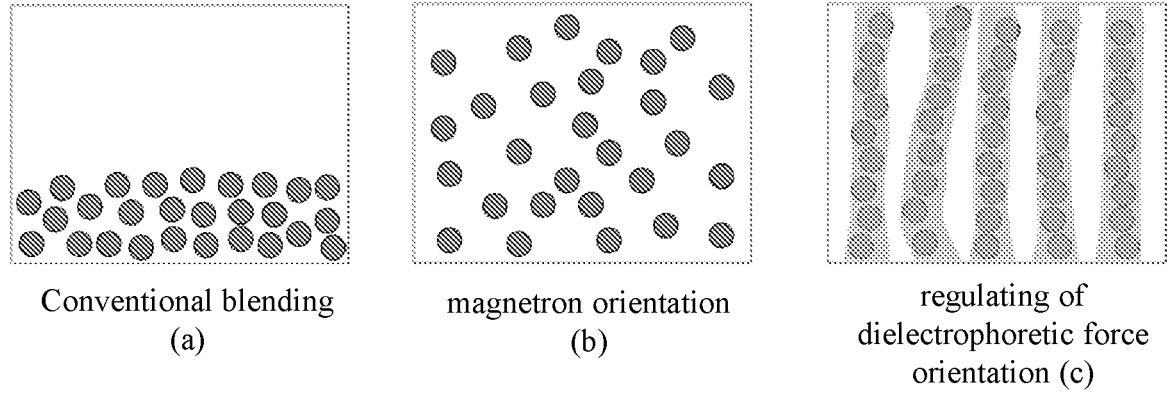
FIG. 3 is a schematic diagram of the principle of a blending preparation method (a), a schematic diagram of the principle of a magnetron orientation preparation method (b), and a schematic diagram of the principle of the dielectrophoretic force orientation process (c) according to some embodiments of the present disclosure.

FIG. 3 is a schematic diagram of the principle of a blending preparation method (a), a schematic diagram of the principle of a magnetron orientation preparation method (b), and a schematic diagram of the principle of the dielectrophoretic force orientation process (c) according to some embodiments of the present disclosure.

Figure 4:
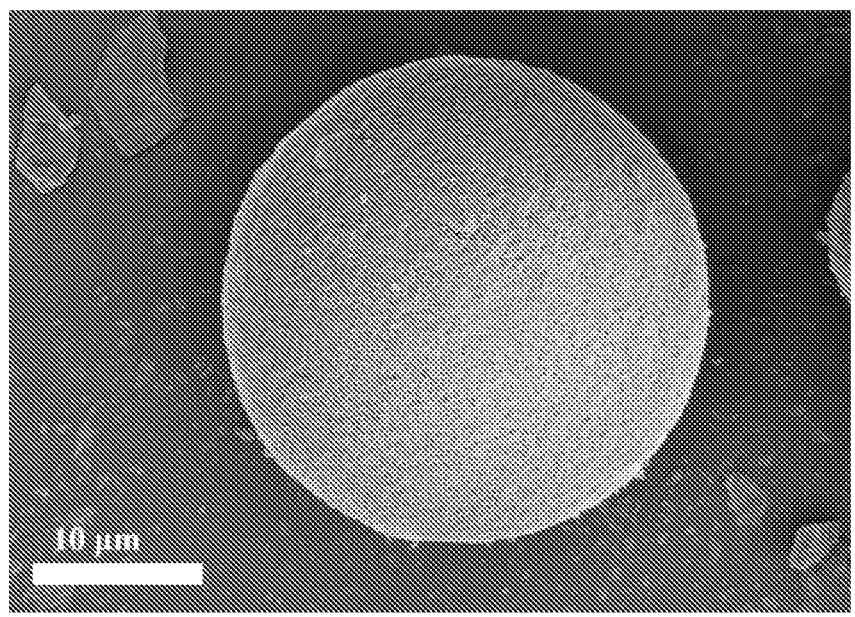
FIG. 4 is a scanning electron microscopy (SEM) image of the dielectric composite microspheres with a dielectric epoxy resin as a core and a hash-BN sheet as a shell according to some embodiments of the present disclosure.

The SEM image of the dielectric composite microspheres prepared in the step 1 is shown in FIG. 4.

Figure 5:
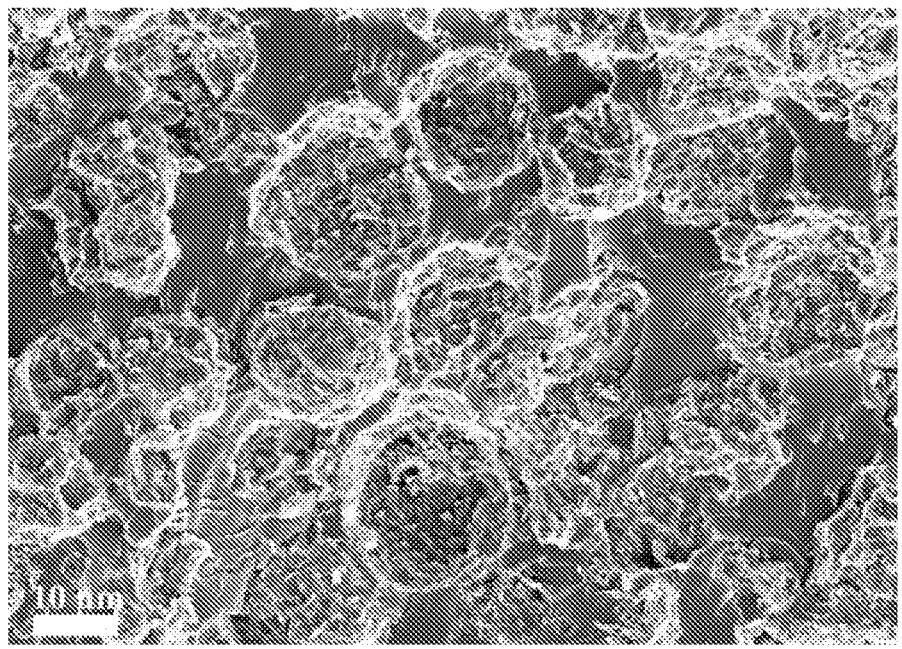
FIG. 5 is a cross-sectional scanning electron microscopy (SEM) image of a prepared composite insulating material fractured by liquid nitrogen cooling according to some embodiments of the present disclosure.

The cross-sectional scanning electron microscopy image of the composite insulating material obtained in the Embodiment 1 fractured by liquid nitrogen cooling is shown in FIG. 5.

Embodiment 2 (E 2)

A difference between this Embodiment and Embodiment 1 is that 2 g of h-BN sheets with a particle size of 5 m-10 m and 2 g of the dielectric composite microspheres were added in the Step 2, resulting in a filler mass fraction of 20 wt % in the composite insulating material.

Comparative Embodiment 1 (Pure Epoxy Resin) (C 1)

Step 1: 10 g of the epoxy resin, 8 g of the curing agent of the epoxy resin, and 0.16 g of the accelerator of the epoxy resin were mixed, mechanically stirred at room temperature with a speed of 200 rpm for 1 h to obtain a homogeneously mixed epoxy resin substrate.

Step 2: the epoxy resin substrate obtained in the step 1 was poured into the dielectric electrophoresis orientation container, then the container was quickly transferred to the vacuum oven and the air pressure was reduced to below 104 Pa at room temperature for 4 h to ensure the full removal of internal air bubbles.

Step 3: the epoxy resin substrate obtained in the step 2 was heated and cured under atmospheric pressure, cured for 2 h at 120° C. and for 2 h at 130° C. After the curing reaction was completed, the product was cooled to room temperature in the oven to obtain a pure epoxy resin insulating material.

Comparative Embodiment 2 (C 2)

An epoxy resin composite material with a filler mass fraction of 20 wt % was prepared using conventional methods.

The only difference between the preparation methods of Comparative Embodiment 2 and the Embodiment 2 is that the step 3 was omitted. That is, no dielectrophoretic force regulation was applied to the filler before and during curing. The preparation was carried out using the conventional stirring and blending method instead of dielectrophoretic force regulation.

Comparative Embodiment 3 (C 3)

The only difference between this Comparative Embodiment and Embodiment 2 is that only 4 g of dielectric microspheres was added as the thermally conductive filler in the step 2 without adding h-BN sheet. The oriented epoxy resin composite material with a filler mass fraction of 20 wt % was obtained after regulating by the dielectrophoretic force.

Figure 6:
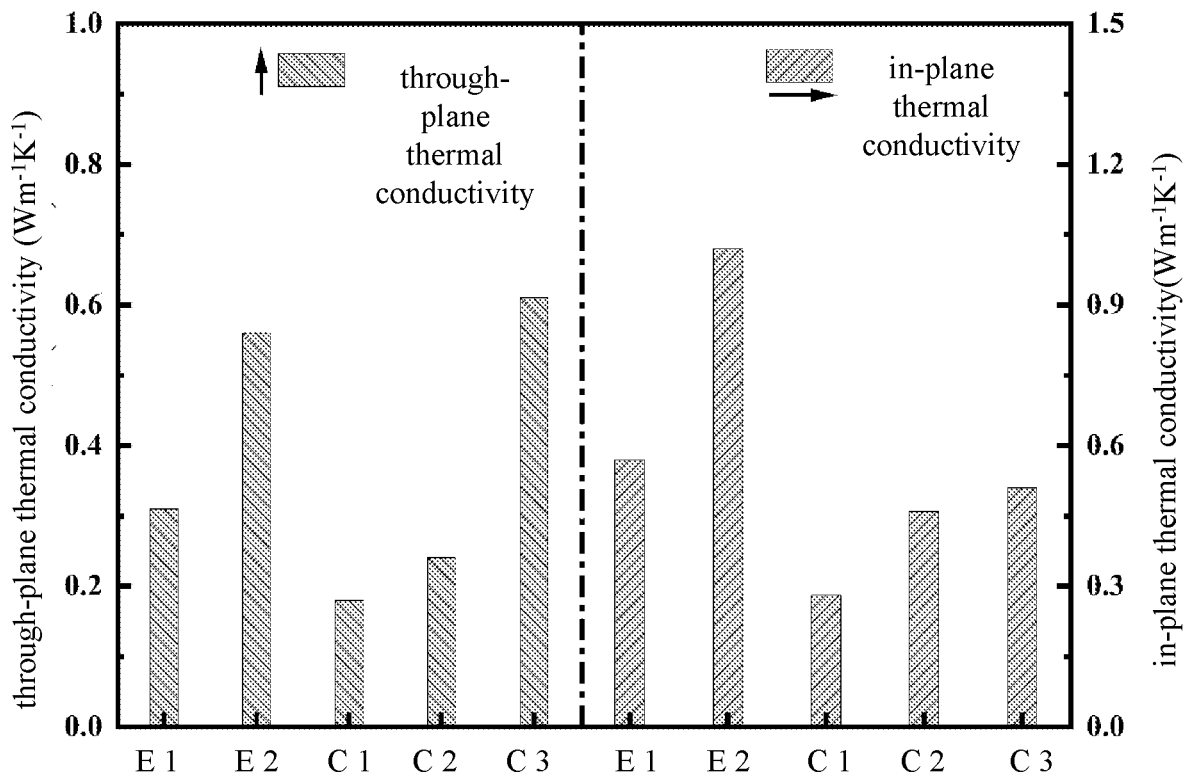
FIG. 6 is a comparison chart illustrating the thermal conductivities of the composite insulating materials prepared using the methods in the Embodiments 1 and 2, and Comparative Embodiments 1 and 2 of the present disclosure.
Figure 7:
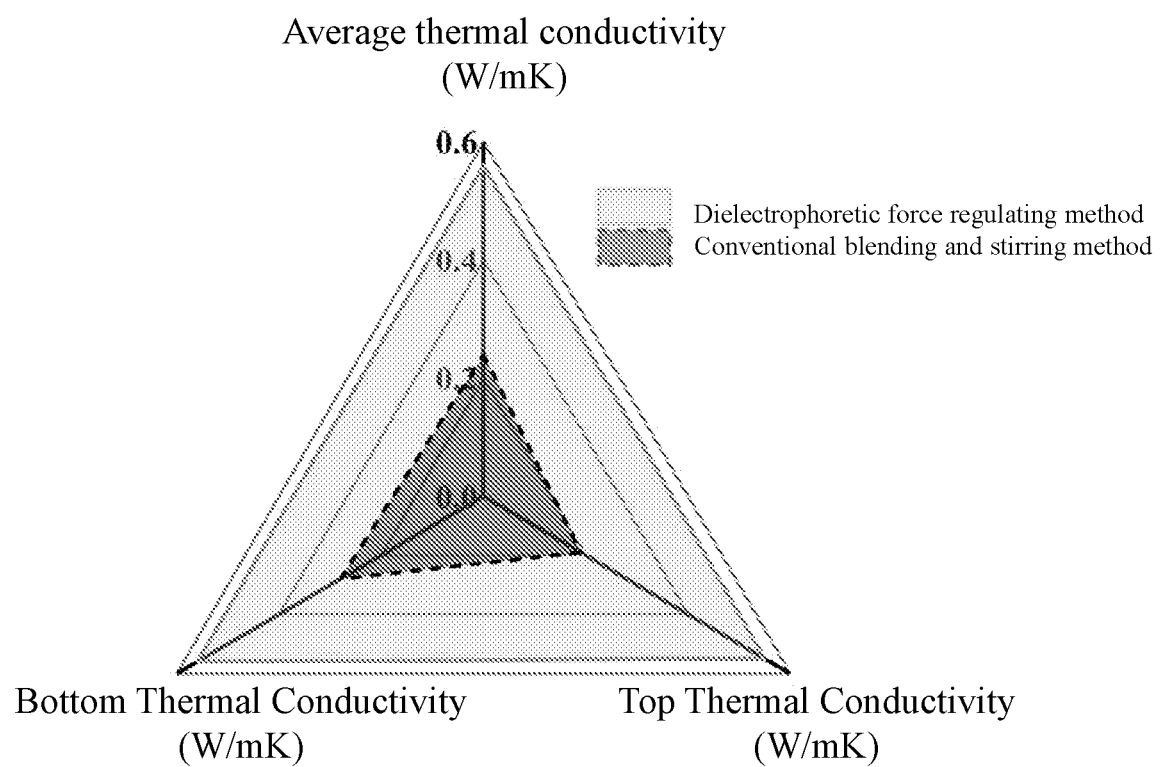
FIG. 7 is a comparison chart illustrating top and bottom thermal conductivities of the composite insulating material of Embodiment 2 and the composite insulating material of Comparative Embodiments 2 measured by a heat flow manner.
Figure 8:
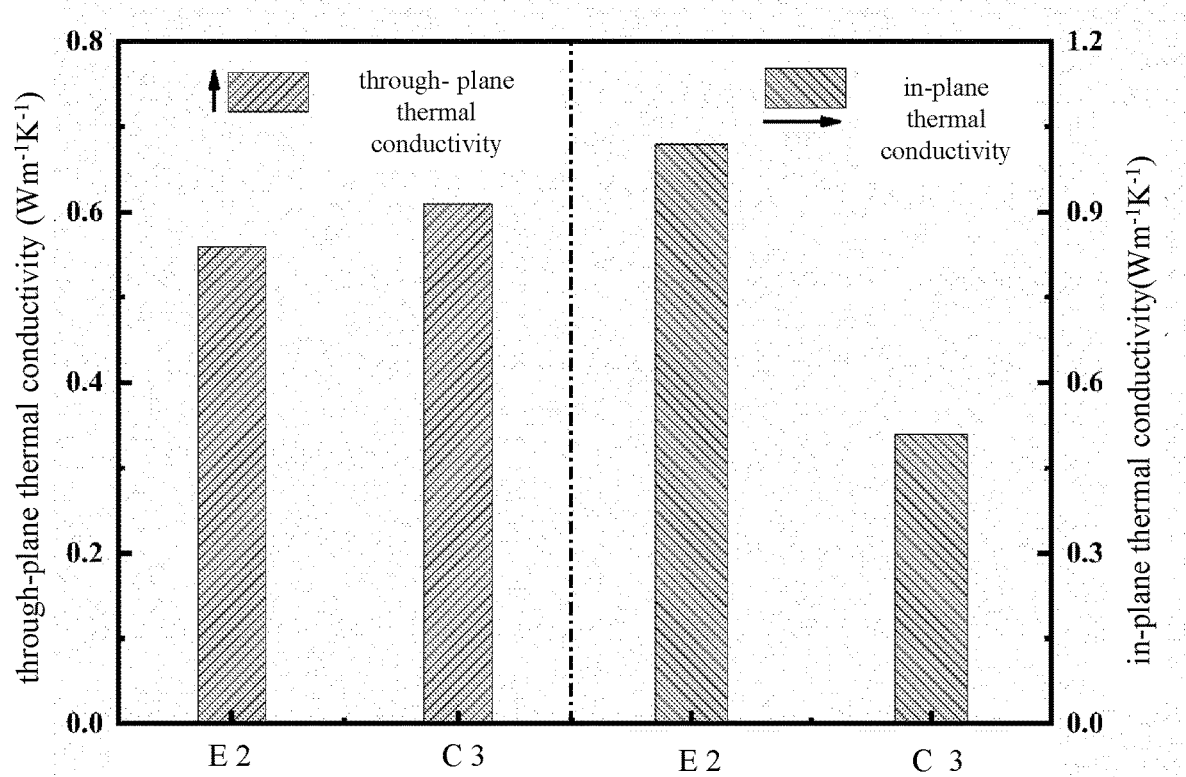
FIG. 8 is a comparison chart illustrating the thermal conductivities of the composite insulating materials prepared using the method in Embodiment 2 and Comparative Embodiment 3 of the present disclosure.

The thermal conductivity of the epoxy resin insulating materials prepared by Embodiments 1 and 2 and the Comparative Embodiments 1, 2, and 3 were tested. The in-plane thermal conductivity of the epoxy resin insulating materials was measured using the laser manner, and the through-plane thermal conductivity was measured using the heat flow manner. The results are shown in FIG. 6. It can be seen that the in-plane and through-plane thermal conductivities of the epoxy resin insulating materials prepared in Embodiments 1 and 2 of the present disclosure are significantly better than those of Comparative Embodiments 1, 2, and 3. That is, the present disclosure achieves a synergistic enhancement of the in-plane and through-plane thermal conductivities of the insulating materials by utilizing the hybridization effect of fillers of different shapes. As shown in FIG. 7, there is a significant difference between the top and bottom thermal conductivities of the epoxy resin composite material measured by the conventional stirring and blending method in the Comparative Embodiment 2. However, the top and bottom thermal conductivities of the epoxy resin composite material in Embodiment 2 where the distribution of fillers was regulated by dielectrophoretic force are almost the same. This indicates that the dielectrophoretic force orientation technique avoids the phenomenon of large mass spherical fillers sinking to the bottom of the epoxy composites during the curing process. As shown in FIG. 8, the thermal conductivity of the composite insulating material prepared by hybridization of dielectric composite microspheres and h-BN sheets in the embodiments of the present disclosure is significantly higher than that of the composite insulating material with a single dielectric composite microsphere filler under the same filler content. The addition of h-BN sheets provides a connection between the adjacent dielectric composite microspheres arranged in a "columnar" manner, greatly enhancing the density of thermal conductivity channels in the in-plane direction. As a result, the Embodiment 2 exhibits much higher in-plane thermal conductivity compared to Comparative Embodiment 3, demonstrating superior overall thermal conductivity performance. Additionally, the h-BN sheets also connect the dielectric composite microspheres arranged vertically, compensating for the through-plane thermal conductivity of the composite material. This explains that in the Embodiment 2, when a mass fraction of the dielectric composite microspheres (10 wt %), as the main components for constructing thermal conductivity channels, is half of that of the Comparative Embodiment 3 (20 wt %), the through-plane thermal conductivity still reaches a level equivalent to that of the Comparative Embodiment 3. Once again, it indicates that the mixed filler (sphere hybridization) has the synergistic effect on enhancing the thermal conductivity of the material.

In summary, the embodiments of the present disclosure provide a method for preparing the composite insulating material based on the dielectrophoretic force orientation. The dielectric microspheres are prepared by dispersing $Al_2O_3$ nano microspheres in epoxy resin with the cetyltrimethylammonium chloride as a surfactant. High thermal conductivity h-BN sheets are then self-assembled on the surface of the dielectric microspheres through emulsion polymerization, resulting in microspheres with excellent isotropic thermal conductivity and a different dielectric constant from the epoxy resin matrix. The isotropic thermal conductivity of the dielectric composite microspheres overcomes the disadvantage of the in-plan thermal conductivity being much higher than the through-plane thermal conductivity caused by the anisotropy of the h-BN sheets.

The basic concepts have been described above, and it is apparent to those skilled in the art that the foregoing detailed disclosure is intended as an example only and does not constitute a limitation of the present disclosure. Although not expressly stated herein, various modifications, improvements, and amendments may be made to this specification by those skilled in the art. Such modifications, improvements, and amendments are suggested in this specification, so they remain within the spirit and scope of the exemplary embodiments of this specification.

Also, the present specification uses specific words to describe the embodiments of the present disclosure. For example, "an embodiment", "the embodiment", and/or "some embodiments" are meant to refer to a certain feature, structure, or characteristic associated with at least one embodiment of the present specification. Accordingly, it should be emphasized and noted that "an embodiment" or "the embodiment" or "an alternative embodiment" mentioned two or more times in different places in the present specification do not necessarily refer to the same embodiment. Furthermore, certain features, structures, or characteristics in one or more embodiments of the present specification may be suitably combined.

Furthermore, unless expressly stated in the claims, the order of processing elements and sequences, the use of numerical letters, or the use of other names described herein are not intended to limit the order of the processes and methods of this specification. Although a number of embodiments of the invention currently considered useful are discussed in the above disclosure by way of various examples, it should be understood that such details serve illustrative purposes only, and that additional claims are not limited to the disclosed embodiments. For example, although the implementation of various components described above may be embodied in hardware devices, it may also be implemented as a software-only solution, such as by installing it on an existing server or mobile device.

Similarly, it should be noted that in order to simplify the presentation of the disclosure of the present specification, and thus aid in the understanding of one or more embodiments of the invention, the preceding description of embodiments of the present specification sometimes combines multiple features into a single embodiment, accompanying drawings, or description thereof. However, this method of disclosure does not imply that the features required by the objects of the present specification are more numerous than those mentioned in the claims. Rather, the claimed subject matter may lie in fewer features than those disclosed in a single embodiment as described above.

Some embodiments use numbers to describe the quantity of components or attributes, and it should be understood that such numbers used in the description of the embodiments are sometimes modified with words like "about," "approximately," or "substantially." Unless otherwise stated, the use of "about," "approximately," or "generally" indicates that a variation of ±20% is permitted in the numbers described. Accordingly, in some embodiments, the numerical parameters used in the specification and claims are approximations, which can vary based on the specific characteristics desired for each embodiment. In some embodiments, the numerical parameters should take into account a specified number of significant digits and employ a general method of rounding. Although the numerical domains and parameters used to determine the breadth of their ranges in some embodiments of this specification are approximations, in specific embodiments, such values are set as precisely as possible.

With respect to each patent, patent application, patent application disclosure, and other material, such as articles, books, manuals, publications, documents, and the like, cited in this specification, the entire contents thereof are hereby incorporated by reference into this specification. Except for application history documents that are inconsistent with the contents of this specification or that create conflicts, documents (currently or hereafter appended to this specification) that limit the broadest scope of the claims of this specification are also excluded. It should be noted that in the event of any inconsistency or conflict between the descriptions, definitions, and/or use of terms in the materials appended to this specification and those described herein, the descriptions, definitions, and/or use of terms in this specification shall prevail.

What is claimed is:

1. A method for preparing an epoxy resin composite insulating material based on dielectrophoretic force orientation, comprising:
   S1, preparing dielectric epoxy resin/boron nitride composite microspheres with a dielectric epoxy resin as a core and a hexagonal boron nitride sheet as a shell, wherein the S1 comprises:
      S11, dispersing $Al_2O_3$ nano microspheres in the epoxy resin to obtain a mixture containing dielectric epoxy resin microspheres; then adding the mixture to deionized water, heating and stirring, to obtain an aqueous dispersion containing the dielectric epoxy resin microspheres;
      S12, adding cetyltrimethylammonium chloride to the aqueous dispersion containing the dielectric epoxy resin microspheres, and stirring at 110° C. to obtain an emulsion containing the dielectric epoxy resin microspheres;
      S13, mixing an epoxy resin curing agent and the hexagonal boron nitride sheet with the emulsion containing the dielectric epoxy resin microspheres obtained in the step S12, stirring at 130° C., to obtain dielectric epoxy resin microspheres with the hexagonal boron nitride sheet self-assembled on the surface; and
      S14, performing centrifugal washing on the dielectric epoxy resin microspheres with the hexagonal boron nitride sheet self-assembled on the surface obtained in the step S13, followed by vacuum freeze-drying at −40° C., to obtain the dielectric epoxy resin/boron nitride composite microspheres with the dielectric epoxy resin as the core and the hexagonal boron nitride sheet as the shell;
   S2, dispersing the dielectric epoxy resin/boron nitride composite microspheres obtained in the step S14 and the hexagonal boron nitride sheet in acetone to obtain a dispersion liquid, and adding an epoxy resin, the epoxy resin curing agent, and an epoxy resin accelerator to the dispersion liquid, and evaporating the acetone to obtain a composite epoxy resin substrate;
   S3, pouring the composite epoxy resin substrate into a container, wherein an upper surface and a lower surface of the container are connected with plate electrodes, respectively, transferring the container to a vacuum oven, vacuuming the vacuum oven at room temperature, and connecting a power supply of the container to adjust a voltage amplitude and a frequency of the plate electrodes, conducting the dielectrophoretic force orientation on the dielectric epoxy resin/boron nitride composite microspheres in the composite epoxy resin substrate, so as to cause the dielectric epoxy resin/boron nitride composite microspheres to arrange along a direction of electric field; and
   S4, increasing a temperature of the container to cure the composite epoxy resin substrate, cutting off the power supply to the container after curing, and obtaining the epoxy resin composite insulating material, wherein gaps between the dielectric epoxy resin/boron nitride composite microspheres in the composite insulating material are filled with the hexagonal boron nitride sheet.

2. The method of claim 1, wherein a particle size of the hexagonal boron nitride sheet in the step S13 is 2 μm.

3. The method of claim 2, wherein a particle size of the hexagonal boron nitride sheet in the step S2 is within a range of 5 μm to 10 μm.

4. The method of claim 1, wherein a particle size of the $Al_2O_3$ nano microspheres is within a range of 20 nm to 40 nm.

5. The method of claim 1, wherein a mass ratio of the hexagonal boron nitride sheet to the dielectric epoxy resin/boron nitride composite microspheres in the step S2 is 1:1.

6. The method of claim 5, wherein in the step S3, the voltage amplitude of the plate electrodes is 2 kV, the frequency of the plate electrodes is 10 Hz, and a vacuum degassing time is 4 h.

7. The method of claim 6, wherein the step S4 is carried out at atmospheric pressure, and the curing the composite substrate comprises: increasing the temperature of the container to 120° C. and curing at 120° C. for 2 h, and increasing the temperature of the container to 130° C. and curing at 130° C. for 2 h.

8. An epoxy resin composite insulating material based on dielectrophoretic force orientation, wherein the epoxy resin composite insulating material is prepared by adopting the method of claim 1.

* * * * *